United States Patent [19]

Buechele-Buecher et al.

[11] Patent Number: 4,688,379
[45] Date of Patent: Aug. 25, 1987

[54] GAS GENERATOR

[75] Inventors: Sigfrid Buechele-Buecher, Meerbusch-Struemp; Klaus Unterstein, Duesseldorf, both of Fed. Rep. of Germany

[73] Assignee: Rheinmetall GmbH, Duesseldorf, Fed. Rep. of Germany

[21] Appl. No.: 836,854

[22] Filed: Mar. 6, 1986

[30] Foreign Application Priority Data

Mar. 6, 1985 [DE] Fed. Rep. of Germany ....... 3507892

[51] Int. Cl.⁴ .................................................. F02K 9/38
[52] U.S. Cl. ............................................. 60/230; 60/253; 55/395; 55/435
[58] Field of Search .................. 60/253, 228, 230; 55/435, 395

[56] References Cited

U.S. PATENT DOCUMENTS

| | | | |
|---|---|---|---|
| 3,211,530 | 10/1965 | Harvey | 55/394 |
| 3,533,222 | 10/1976 | Gasperini | 55/394 |
| 3,988,888 | 11/1976 | Jacobson | 60/253 |
| 4,118,930 | 10/1978 | Jacobson et al. | 60/253 |

*Primary Examiner*—Louis J. Casaregola
*Assistant Examiner*—Timothy S. Thorpe

[57] ABSTRACT

The invention concerns a gas generator with a fuel gas filter for the pyrotechanical production of gases from a propellant charge. A separator chamber is disclosed that is designed with annular slots for the purpose of cleaning gas contaminated with solid residue from combustion. The gases produced in the combustion chamber enter the separator chamber through tangentially arranged gas ducts. After flowing through the annular formed separator chamber, the gases flow around the frontal area of the central axially arranged center block before they reach the guidance components, which are sensitive to soiling. Subsequently, the hot gases exit by way of a jet. Through the effect of centrifugal forces, the contaminating particles are slung against the outer wall of the annularly slotted separator chamber and are held fast in its special profile.

6 Claims, 3 Drawing Figures

GAS GENERATOR

FIELD OF THE INVENTION

This invention relates to an improved gas generator with a combustion chamber and a jet containing a separator between said chamber and jet as fully described in the specification and claims of this patent application.

DESCRIPTION OF THE PRIOR ART

For the final guidance phase of missiles and projectiles, impulse drives have been employed, which are impacted with the highly pressurized gas of a fuel gas generator. High pressurized gas can be produced in a particularly simple and economical method with a gas generator which pyrotechnically converts a propellant charge existing in solid form. A disadvantage, however, with such a gas generator is the contamination of the pyrotechnically produced gas by residue from combustion, and propellant charged particles which are pulled along. This contamination influences the proper functioning and thus the operational safety of the guidance components, as, for example, solenoid or high pressure relief valves which are necessary for the proper functioning of the impulse drive.

In order to remove the unfavorable contamination of the gas produced in the generator, a separator arrangement must be provided behind the combustion chamber in which the gases are produced from the propellant charge. Conventional screens are not suitable for this purpose, because they cannot withstand the large thermal and mechanical stress. This is due to the fact that one must contend with combustion temperatures of magnitudes between 1400 K. and 2000 K., with over 200 bar peak pressure, and the high velocity of flow of the produced gases. In addition, the separator arrangement must also be launch resistant.

SUMMARY OF THE INVENTION

An object of the present invention is to obtain a gas generator with a reliable separator arrangement which will withstand the stressful and unfavorable conditions mentioned above. Another object of the present invention is to reliably purge from the produced gases, any of said existing solid contaminating particles. An additional object of the present invention is to create an apparatus of simple construction which can be more economically and easily manufactured. The objects described above have been reached by way of the invention as disclosed in this application and claimed in the appended independent claim 1. Other preferred embodiments of the invention are given in the dependent claims 2–7.

BRIEF DESCRIPTION OF THE DRAWINGS AND OF A PREFERRED EMBODIMENT

These and other objects of the invention will become apparent with reference to the following drawings and specifications wherein.

Figure 1:
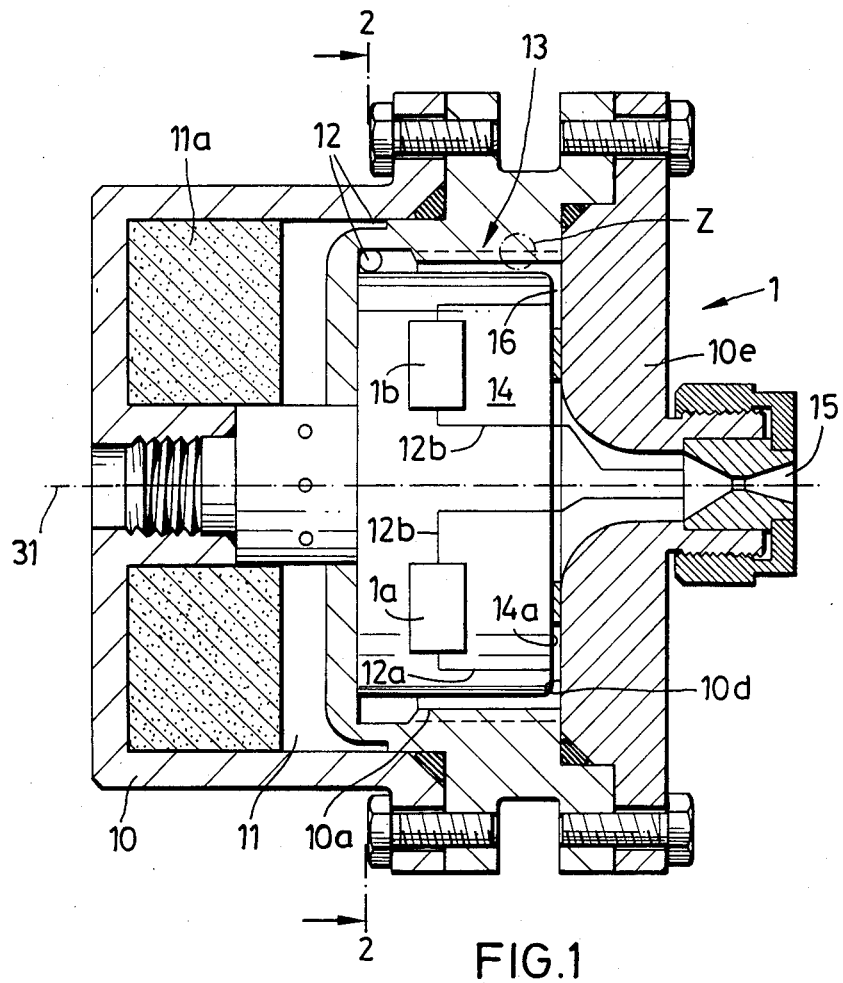
FIG. 1 is a longitudinal cross-sectional view through the gas generator.

FIG. 1 shows a longitudinal cross-sectional view through the gas generator 1. A combustion chamber 11 is enclosed by a housing 10, in which is arranged a pyrotechnically gas producing propellant charge 11a. The combustion chamber 11 discharges into a jet 15 which is the outlet for the inner portion of the gas generator 1 into the outside surroundings. The gas generator 1, in conjunction with the guidance components 1a, 1b (only shown schematically in the drawing) can be utilized as an impulse drive for missiles or projectiles and is capable, in accordance with the piloting of the produced gas flow, of preferably influencing the flight path during the final guidance phase of the missile or projectile.

The hot gases produced from the propellant charge of the 11a, which produce temperatures of a magnitude between 1400 K. and 2000 K., and which flow toward the jet 15 over the guidance means 1a, 1b, with a pressure in access of 200 bar are contaminated with solid particles of the residue from combustion, i.e. propellant particles which are pulled along, and therefore, influence the proper functioning of the guidance means 1a, 1b in the guidance of the gas flow. The contamination can, moreover, reduce the gas ducts 12 existing the cross section, resulting in undesirable flow conditions.

Figure 2:
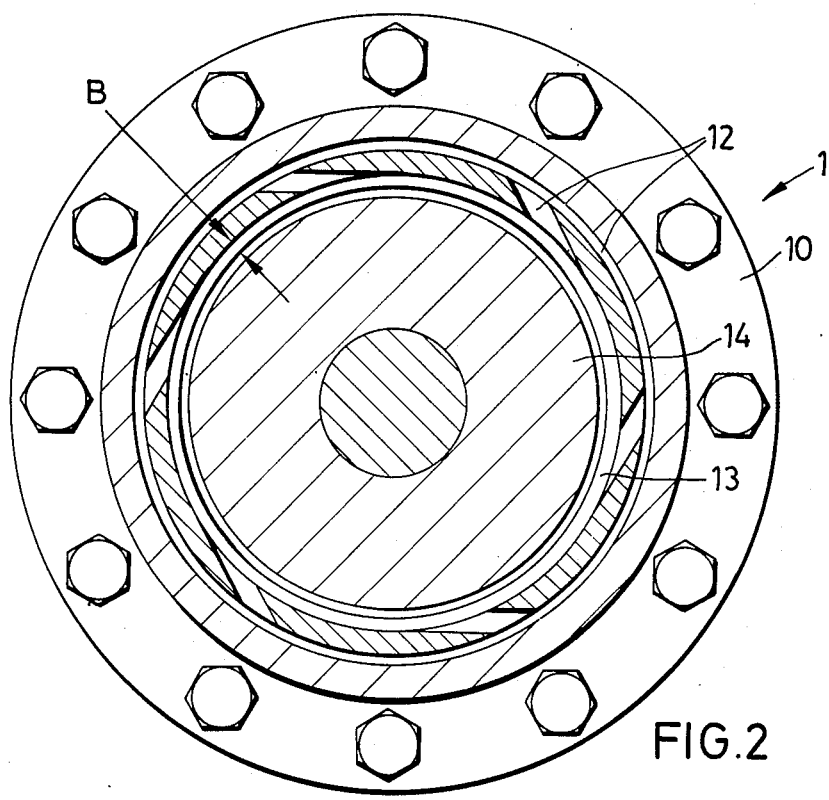
FIG. 2 is a cross-sectional view along the line 2—2 shown in FIG. 1.
Figure 3:
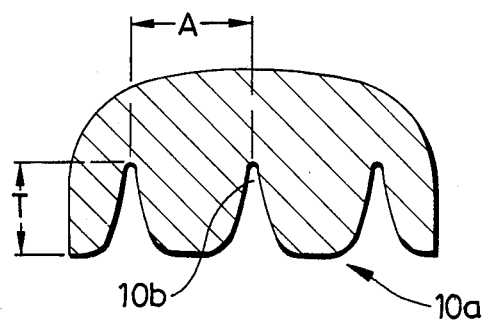
FIG. 3 is a greatly enlarged single representation of the area Z of FIG. 1.

In order to overcome this contamination, a separator is arranged behind the combustion chamber 11, which also completely holds back the solid particles pulled along by the gas flow. This separator comprises an annularly slotted separator chamber 13, which is constructed of a central center block 14 and an inside surface 10a of the housing 10, coaxially surrounding said central center block 14. The inside surface of the annular separator chamber 13 is designed and arranged, for example, as shown in the enlarged detailed representation of the FIG. 3, as a structured inside surface 10a. The structure is produced by the trough formed recesses 10b arranged on the inside surface 10a, which can be constructed in annular trough form, but preferably are shaped in spiral form construction, the recesses 10b run on the inside surface 10a of the housing 10, in a peripheral direction. In a preferred embodiment of the invention the trough shaped recesses are arranged in a spiral form like a thread with a great pitch on the inside of the cylindrical housing. The annularly formed separator chamber 13 is connected with the combustion chamber 11 by way of tangentially entering gas ducts 12 as can be seen from FIG. 2. The gas generator operates as follows: after ignition of the gas producing propellant charge 11a, by means of ignition charge (not shown) which preferably electrically by way of a control signal, high pressure hot gases form in the combustion chamber 11 by way of combustion of the propellant charge 11a, which by way of the tangentially entering gas ducts 12 in the annularly formed separator chamber 13, enter the separator chamber 13 are thereby forced into rotational motion about the center block 14. As a result of the centrifugal force acting on the solid contaminating particles, these particles are swung outwardly in a radial direction, and attached themselves to the trough formed recesses 10b of the structured inside surface 10a of the housing 10. The structured inside surface ensures that the contaminating particles once trapped, and which in addition tend to coalesce through wetting with residue from insulation, are held fast and not again pulled along by the subsequent stream of gas. After passing annularly formed separator, chamber 13, the gases produced in the combustion chamber 11 are guided a new in radal direction toward the inside of the gas generator 1 to the longitudinal axis 31 because they must flow around the frontal area 14a of the center block 14. Since this flow direction is opposite the centrifugal force in the outward radial direction, the heavy contaminating particles cannot reach the guidance components 1a, 1b, which are sensitive to soiling.

Guidance components (only schematically shown in the drawings) such as valves or the like, which can, for example, affect a throttling of the gas flow, can be installed in a favorable and space saving way in the centrally located center block 14. The gas flow from the annularly slotted separator chamber 13 reaches the guidance means 1a, 1b arranged in the center block 14, by way of the gas ducts 12a. The gas flow from these guidance means, which influence the gas flow, then reaches the jet 15 by way of the gas ducts 12b.

Gas generators with a relatively large waste cross section surface can also be manufactured in accordance with the above described principle, because the effectiveness of the separator improves with an increased separator chamber radius, and the increasing linear centrifugal force dependent on the separator chamber radius.

The gas generator 1 is mechanically sturdy and simple in construction, because the separator chamber 13 does not contain any thermally and/or mechanically susceptible screen components. The gas generator 1 is also easily manufactured due to its relatively simple construction, because of a fully operational separator arrangement exists after the production of the structured inside surface 10a and the installation of the centrally arranged center block 14. The width B of the annularly slotted separator chamber 13 can be between 1 mm and 4 mm. In a preferred embodiment, the width B is 2 mm. The height of the annular slot of the annularly slotted separator chamber 13 is very much dependent upon the available volume of installation. In a preferred embodiment of the invention, a nearly complete cleaning of the produced fuel gas was achieved with a height of approximately 45 mm.

The depth T of the trough formed recesses 10b can lie between 1 mm and 5 mm. Particularly favorable cleaning results were achieved with a depth of 3 mm. The separation distance A of the trough formed recesses 10b can be between 1 mm and 7 mm. Favorable results were achieved with a separation distance of 4 mm. The base of the recesses 10b is preferably rounded in construction, specifically with a radius of curvature under 1 mm. The side walls of the recesses 10b are comprised of surface elements with variable curvature radius, specifically, one surface element having a larger curvature radius is initially attached to the base of the recesses 10b and finally joined at the flat inside wall 10a with a surface element with a lesser curvature radius.

While there has been described a particular embodiment of the invention, it will be apparent to those skilled in the art that variations may be made thereto without the parting from the spirit of the invention and the scope of the appended claims.

We claim:

1. A gas generator, integrated in missiles or projectiles, for controlling the final guidance phase of themselves by impulse drives, which are impacted with highly pressurized gas of the gas generator, which includes a combustion chamber and a jet, as well as a separator, for the purpose of cleaning the gas contaminated with solid residue from combustion arranged in gas-flow-direction between the combustion chamber and the jet, wherein the separator comprises:
   a separator chamber which is formed in a slot-like annular shape in axial direction; said separator chamber is limited in axial direction by
   a partition wall to the combustion chamber, and on its other side by
   a disklike endwall, and in radial direction by the inside surfaces of
   a cylindrical outer housing and
   an axially arranged center block; said inside surface of the outer housing having recesses which are constructed in a peripherally extending through form;
   said separator chamber is connected with the combustion chamber by way of
   gas ducts tangentially entering inwardly the separator chamber from the outside inwardly in a plane rectangular to the axial direction.

2. A gas generator according to claim 1, wherein means are provided for deflecting the gases, which were passed through the separator chamber towards the inside surface, in a radial direction.

3. A gas generator according to claim 2, wherein the said means for deflecting the gases consists of an annular disk shaped radially extending slot between the front side of said axially arranged center block and the endwall of the housing.

4. A gas generator according to claim 1, wherein the width of the separator chamber in radial direction is between 1 mm and 4 mm.

5. A gas generator according to claim 1, wherein the trough shaped recesses are arranged in a spiral form along the inside surface of the cylindrical housing.

6. A gas generator according to claim 5, wherein the depth of the trough shaped recesses are 1 mm to 5 mm, and
the peripheral distance of the trough shaped recesses is 1 mm to 7 mm.

* * * * *